United States Patent [19]
Lin

[11] Patent Number: 6,034,869
[45] Date of Patent: Mar. 7, 2000

[54] LOCKING APPARATUS FOR LOCKING A NOTEBOOK COMPUTER ON A DOCKING STATION

[75] Inventor: Jin-Jen Lin, Chang-Hua Ksien, Taiwan

[73] Assignee: Compaq Computer Corporation, Houston, Tex.

[21] Appl. No.: 08/772,182

[22] Filed: Dec. 20, 1996

[51] Int. Cl.[7] .............................. G06F 1/16; H05K 5/02
[52] U.S. Cl. ........................................... 361/686; 439/638
[58] Field of Search .................................. 361/686, 683, 361/726–727, 732, 740, 741, 754, 759, 798; 439/638, 159; 312/223.1–3; 364/708.1

[56] References Cited

U.S. PATENT DOCUMENTS

| | | | |
|---|---|---|---|
| 5,313,596 | 5/1994 | Swindler et al. | 395/325 |
| 5,535,093 | 7/1996 | Noguchi et al. | 361/686 |
| 5,552,959 | 9/1996 | Penniman et al. | 361/686 |
| 5,619,398 | 4/1997 | Harrison et al. | 361/686 |
| 5,790,375 | 8/1998 | Lee | 361/686 |
| 5,805,412 | 9/1998 | Yanagisawa et al. | 361/686 |
| 5,864,294 | 1/1999 | Hsu et al. | 340/635 |

*Primary Examiner*—Benjamin R. Fuller
*Assistant Examiner*—Jagdish Patel
*Attorney, Agent, or Firm*—Kanneker & Smith, P.C.

[57] ABSTRACT

An assembly of a notebook computer and a docking station includes a locking apparatus for locking the computer on the station. The apparatus includes a front retaining unit attached to the station and engaged within a front recess unit in the front end portion of the computer, and a rear retaining unit attached to the station and engaged within a rear recess unit in the rear end portion of the computer. In this situation, the computer is coupled completely with a connector unit on the station. Because the front and rear end portions of the computer are locked on the station by means of the retaining units which constitute a double lock, the computer cannot be removed forcibly from the station without disengaging the retaining units from the recess units. By operating an actuator unit on the base in a single action, a slide unit moves on the base so as to disengage the retaining units from the recess units at the same time and so as to disconnect the computer from the connector unit, thus unlocking the computer from the station. Then, the computer can be locked again on the station and coupled completely with the connector unit in a one-action operation on the actuator unit.

30 Claims, 5 Drawing Sheets

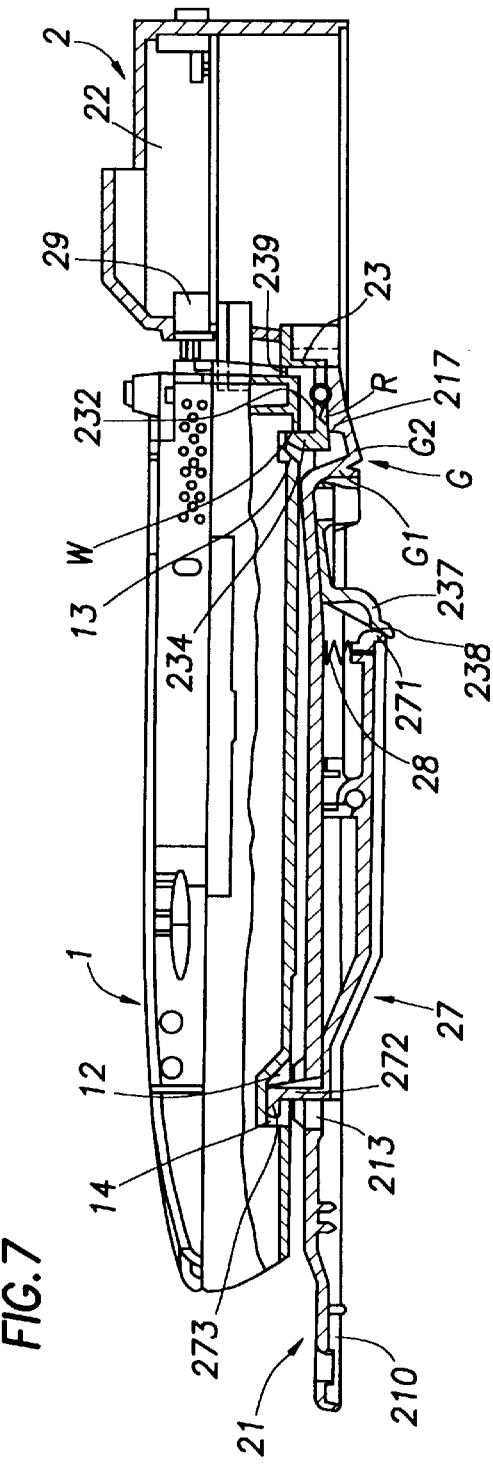
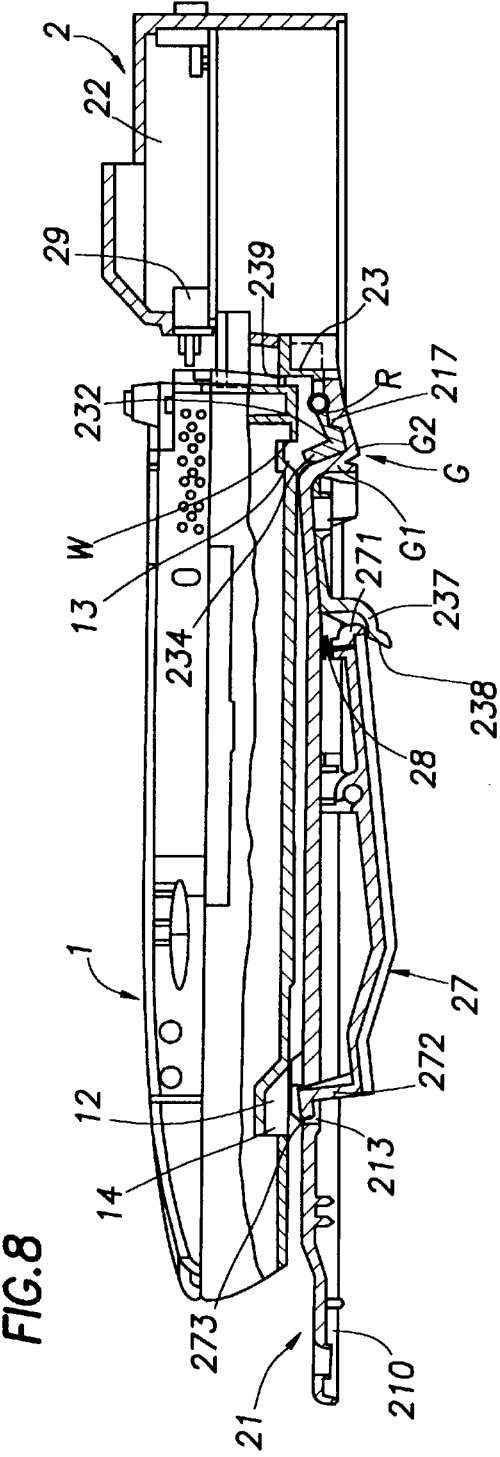

LOCKING APPARATUS FOR LOCKING A NOTEBOOK COMPUTER ON A DOCKING STATION

BACKGROUND OF THE INVENTION

1. Field of the Invention

This invention generally relates to an assembly of a notebook computer and a docking station and, in a preferred embodiment thereof, more particularly relates to a locking apparatus for locking the notebook computer on the docking station in a double-lock manner.

2. Description of Related Art

In this art, a docking station has been employed to interconnect a notebook computer and one or more peripheral devices, such as card or paper-tape readers, magnetic-tape handlers, and line printers. A docking station typically consists of a base and a connector-mounting rear fence projecting upward from the rear end portion of the base. In use, the notebook computer is placed on the top wall of the base and is connected to the connectors mounted on the rear fence. A rear end portion of the notebook computer is locked on the base of the docking station by engaging a pivotable retaining unit within a recess in the bottom surface of the notebook computer by rotating a push lever to a locking position. The pivotable retaining unit may be broken unintentionally in a situation where the notebook computer is pulled forwardly away from the rear fence of the docking station without releasing the push lever from the locking position.

SUMMARY OF THE INVENTION

In carrying out principles of the present invention, in accordance with a preferred embodiment thereof, a specially designed double-locking docking station is provided for use in operatively connecting a portable computer to a peripheral device, the portable computer having a first electrical connector thereon.

From a broad perspective, the docking station comprises a first portion on which a second electrical connector is carried, and a second portion on which the portable computer may be placed. Drive and latch apparatus is provided and is selectively operative to engage the portable computer and (1) drive the portable computer along the second docking station portion toward the first docking station portion in a docking direction and responsively couple the first and second electrical connectors and releasably latch the portable computer to the second docking station portion at two locations spaced apart in the aforementioned docking direction, and (2) drive the portable computer along the second portion away from the first portion in an undocking direction and responsively uncouple the first and second electrical connectors and unlatch the portable computer from the second docking station portion.

In a preferred embodiment of the invention, an assembly of a notebook computer and a docking station includes a locking apparatus for locking the computer on the station. The apparatus includes a front retaining unit attached to the station and engaged within a front recess unit in the front end portion of the computer, and a rear retaining unit attached to the station and engaged within a rear recess unit in the rear end portion of the computer. In this situation, the computer is coupled completely with a connector unit on the station. Because the front and rear end portions of the computer are locked on the station by means of the retaining units which constitute a double lock, the computer cannot be removed forcibly from the station without disengaging the retaining units from the recess units. By operating an actuator unit on the base in a single action, a slide unit moves on the base so as to disengage the retaining units from the recess units at the same time and so as to disconnect the computer from the connector unit, thus unlocking the computer from the station. Then, the computer can be locked again on the station and coupled completely with the connector unit in a one-action operation on the actuator unit.

BRIEF DESCRIPTION OF THE DRAWINGS

FIG. 7 illustrates how the notebook computer is locked partly on the docking station by the locking apparatus of this invention; and FIG. 8 illustrates how the notebook computer is unlocked from the docking station.

DETAILED DESCRIPTION

Figure 1:
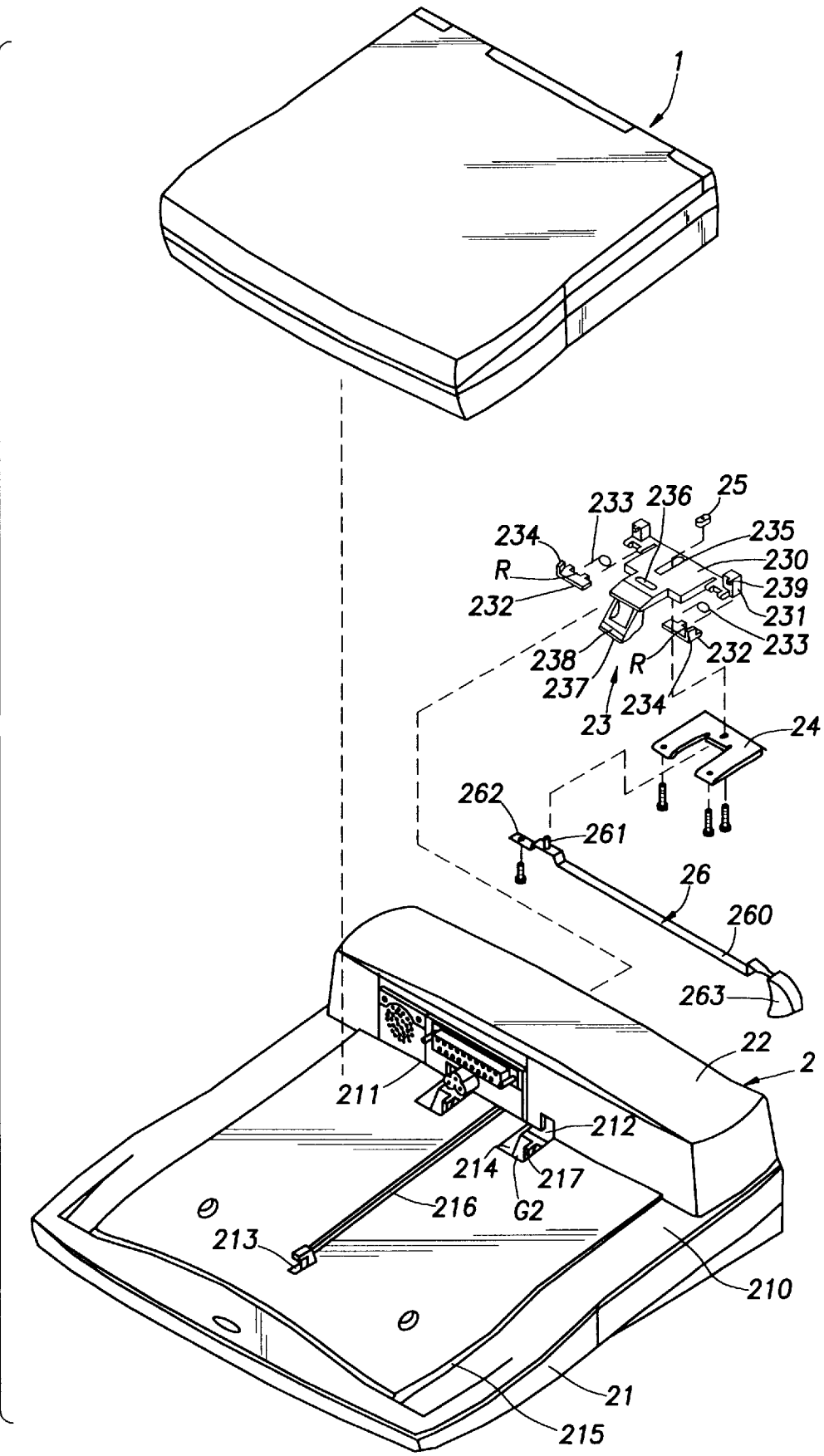
FIG. 1 is a partly exploded view illustrating a docking station and a notebook computer which is locked on the docking station by means of a locking apparatus of this invention.

FIG. 1 shows a notebook computer 1 and a docking station 2 on which the notebook computer 1 can be locked by means of a locking apparatus of this invention. As illustrated, the docking station 2 has a base 21 and a rear fence 22 fixed on and above the rear end portion of the base 21. The base 21 is provided with a generally rectangular top wall 210 which has a generally straight rear side 211 that is connected fixedly to the rear fence 22. The locking apparatus includes a slide unit 23, a U-shaped retainer plate 24 made of metal, a plastic guide block 25 and a metal push lever 26.

The slide unit 23 is generally T-shaped and has a plastic main body 230, tow arms 231 extending integrally from two sides of the main body 230, two follower sheets 232 pivoted to the arms 231 respectively and rotatable about a horizontal axis parallel to the rear side 211 of the top wall 210, and two rear springs or coiled torsion springs 233 interconnecting the arms 231 and the follower sheets 232 so as to bias the follower sheets 232 to press against the top surface of the top wall 210 of the base 21, thus clamping the top wall 210 between the main body 230 and the follower sheets 232. Each of the follower sheets 232 has a tongue 234 projecting upward therefrom, and a rib engaging recess (R) formed in the bottom surface thereof. The tongues 234 constitute a rear retaining unit. The main body 230 has a rear portion with a guide slot 235 formed therethrough and extending in a direction generally perpendicular to the rear side 211 of the top wall 210, a middle portion with a slide slot 236 formed therethrough and extending in a direction perpendicular to the guide slot 235, and a downwardly projecting front portion 237 having a curved pressing surface 238. Each of the arms 231 has an integral finger 239 which projects horizontally and forwardly from a rear end portion thereof and which is located at a level above the top wall 210 of the base 21. The fingers 239 constitute a finger unit.

The retainer plate 24 is bolted to the bottom surface of the top wall 210 of the base 21 by bolts, the rearmost one of which extends through the plate 24, a hole formed through the guide block 25, and the guide slot 235 of the slide unit 23, so as to clamp the guide block 25 between the retainer plate 24 and the top wall 210, such that the retainer plate 24 is spaced apart from the top wall 210. Because the guide block 25 is slightly thicker than the middle section of the main body 230 of the slide unit 23, in which the guide slot 235 and the slide slot 236 are formed, the slide unit 23 can slide horizontally between the top wall 210 and the retainer plate 24. Moreover, since the guide block 25 is slightly narrower than the guide slot 235 of the slide unit 23, the slide unit 23 can slide on the base 21 along a straight path which is perpendicular to the rear side 211 of the top wall 210 of the base 21.

The push lever 26 includes a lever body 260 and a vertically extending pin 261 which is secured to an intermediate portion of the lever body 260 and which is engaged slidably in the slide slot 236 of the slide unit 23. The lever body 260 has a pivot end 262 mounted pivotally on the top wall 210 of the base 21, and a finger-actuated end 263 which is exposed to the exterior of the docking station 2 and which is rotatable about the pivot end 262 so as to move the pin 261 in the slide slot 236, thereby moving the slide unit 23 on the top wall 210 of the base 21.

As illustrated, the top wall 210 of the base 21 has two aligned notches 212 formed in the rear side 211 of the top wall 210 so as to locate the arms 231 of the slide unit 23 in the notches 212, a hole 213 formed through front end portion of the top wall 210, two positioning grooves 214 which are formed in a top surface thereof and which are in front of and in the proximity of the notches 212 so as to locate the follower sheets 232 in the positioning grooves 214 respectively, a generally rectangular projection 215 which projects integrally upward from the top surface thereof and which has a width approximate to that of the notebook computer 1, and a guide slot 216 formed in the top surface of the top wall 210 and extending in a direction perpendicular to the rear side 211 of the top wall 210.

Figure 2:
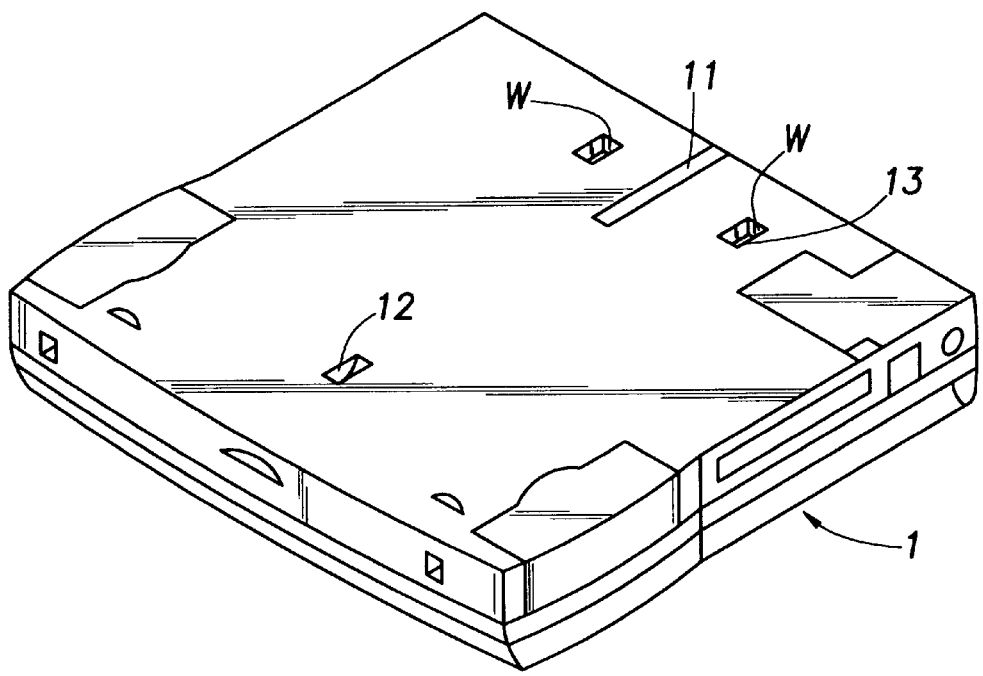
FIG. 2 is a perspective view illustrating the structure of the bottom surface of the notebook computer, forming parts of the locking apparatus according to this invention.

Referring to FIG. 2, the bottom surface of the notebook computer 1 has a guide rib 11, a front recess unit 12 consisting of a rectangular recess formed in the front end portion thereof, and a rear recess unit consisting of two aligned rear recesses 13 formed in the rear end portion thereof.

Figure 3:
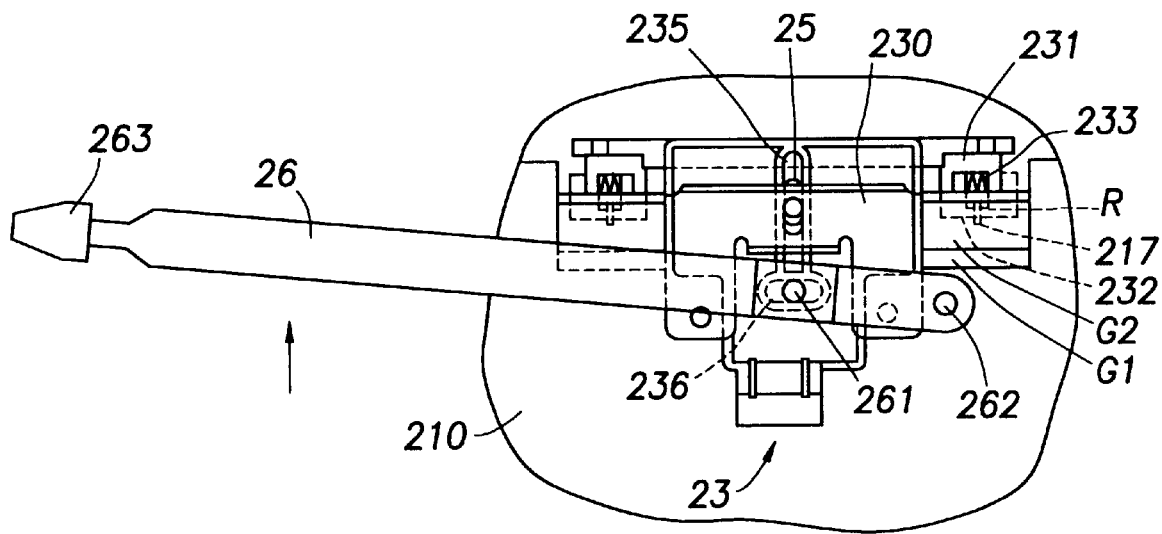
FIG. 3 illustrates the completely locked position of a push lever of the locking apparatus according to this invention.
Figure 6:
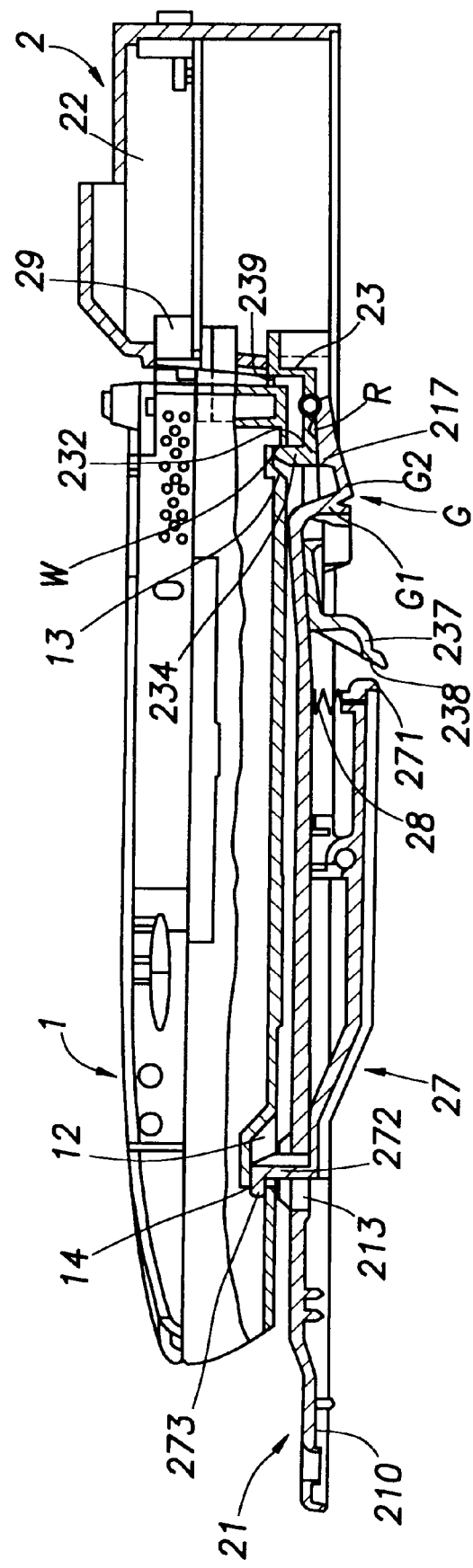
FIG. 6 illustrates how the notebook computer is locked completely on the docking station by the locking apparatus of this invention.

As shown in FIGS. 1, 3 and 6, the top wall 210 of the base 21 is made of plastic and has two groove-forming portions (G), each of which has a generally V-shaped cross-section and includes a front inclined plate section G1 and a rear inclined plate section G2 that are interconnected at the lower ends thereof at a straight line generally parallel to the rear side 211 of the top wall 210. The locking apparatus further includes two supporting ribs 217 which integrally and upwardly project from the rear inclined plate sections G2 in front of the rib engaging recesses (R) of the follower sheets 232 and which extend in a direction perpendicular to the rear side 211 of the top wall 210, as such, the follower sheets 232 are located over the supporting ribs 217.

Referring to FIG. 6, the notebook computer 1 further has a latch hole 14 formed through a wall thereof and communicated with the front recess unit 12. The locking apparatus further includes a latch bar 27 and a front spring 28 which is a coiled compression spring in this embodiment. The latch bar 27 is mounted pivotally in the base 21 at an intermediate portion thereof and has a rear end portion 271 and a front end portion which is provided with a fixed front retaining unit 272 that is generally Z-shaped and that is engaged in the front recess unit 12 of the notebook computer 1 so as to prevent forward removal of the notebook computer 1 from the rear fence 22 of the docking station 2. As illustrated, an insert rod 273 is integrally formed on the front retaining unit 272 and is inserted into the latch hole 14 of the notebook computer 1 so as to prevent upward removal of the notebook computer 1 from the base 21 of the docking station 2, thus locking the notebook computer 1 on the docking station 2. The front spring 28 has an upper end fastened to the bottom surface of the top wall 210, and a lower end fastened to the rear end portion 271 of the latch bar 27 so as to bias the front retaining unit 272 of the latch bar 27 into the front recess unit 12 through the hole 213 of the top wall 210.

FIG. 3 illustrates the completely locked position of the push lever 26, in which the notebook computer 1 (see FIG. 1) is located at the completely connected position shown in FIG. 6. In this situation, as shown in FIGS. 3 and 6, the notebook computer 1 is coupled completely with a connector unit 29 on the rear fence 22 of the docking station 2 in such a manner that the fingers 239 of the slide unit 23 abut against a rear end portion of the notebook computer 1 and that the insert rod 273 of the latch bar 27 is inserted into the latch hole 14 of the notebook computer 1. At this time, the slide unit 23 is spaced apart from the rear end portion 271 of the latch bar 27 and is located at its rear limit position on the docking station 2 in which the follower sheets 232 are located over the supporting ribs 217 in such a manner that the recesses (R) of the follower sheets 232 are disengaged from the supporting ribs 217 so that the tongues 234 of the follower sheets 232 are inserted into the rear recesses 13.

Figure 4:
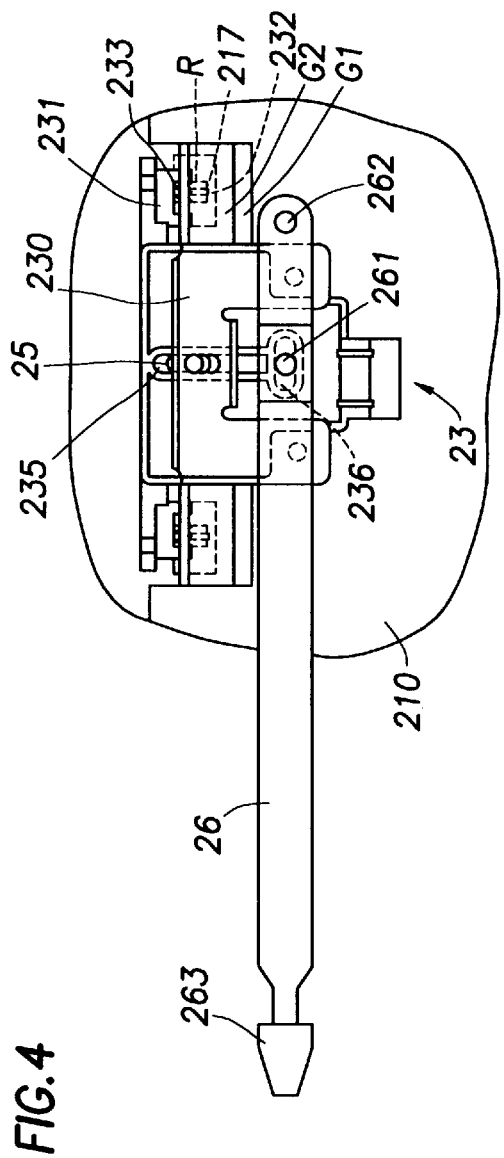
FIG. 4 illustrates the partly locked position of the push lever of the locking apparatus according to this invention.

The push lever 26 can be rotated about the pivot end 262 to a partly locked position shown in FIG. 4 so as to move the notebook computer 1 on the docking station to a partly connected position shown in FIG. 7. In this situation, as shown in FIGS. 4 and 7, the pin 261 of the push lever 26 moves in the slide slot 236 of the slide unit 23 so as to move the slide unit 23 forward on the top wall 210, thus contacting the front portion 237 of the slide unit 23 with the rear end portion 271 of the latch bar 27. When the push lever 26 is rotated from the completely locked position to the partly locked position, the fingers 239 impel the notebook computer 1 to the partly connected position in which the notebook computer 1 is disconnected partly from the connector unit 29 and in which the insert rod 273 of the latch bar 27 is disengaged from the latch hole 14 of the notebook computer 1 while still maintaining the engagement of the front retaining unit 272 of the latch bar 27 within the front recess unit 12 of the notebook computer 1. Under this condition, the notebook computer 1 can be moved manually upward away from the docking station 2.

Figure 5:
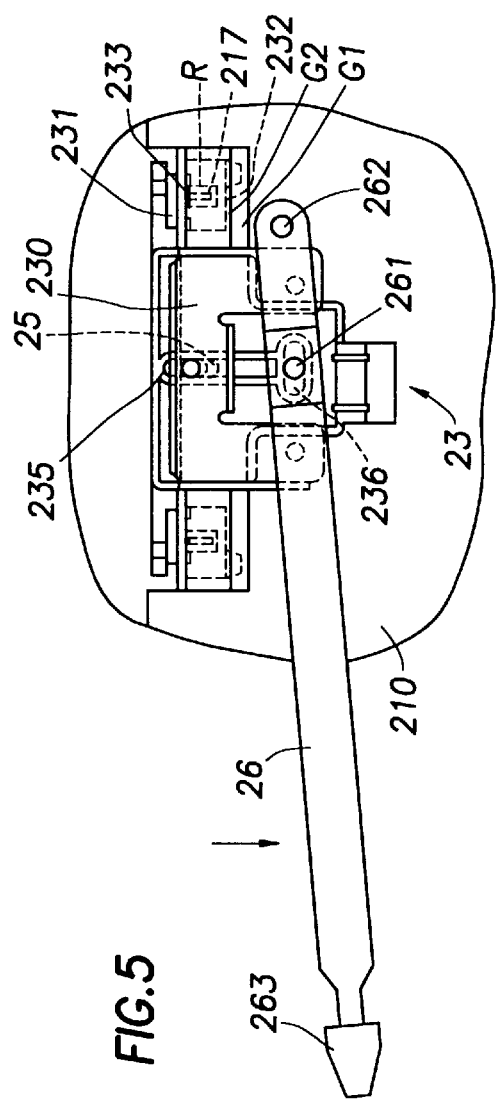
FIG. 5 illustrates the unlocking position of the push lever of the locking apparatus according to this invention.

The push lever 26 can also be rotated from the completely locked position of FIG. 3 to an unlocking position shown in FIG. 5 via the partly locked position shown in FIG. 4, in a single one action, so as to move the slide unit 23 from the rear limit position of FIG. 6 to a front limit position shown in FIG. 8 via the position of FIG. 7. As shown in FIGS. 5 and 8, when the push lever 26 is rotated from the partly locked position to the unlocking position, the slide unit 23 continues to move forward on the top wall 210 so that the fingers 239 impel the notebook computer 1 to move to a disconnected position on the top wall 210, in which the notebook computer 1 is disconnected completely from the connector unit 29, and so that the rib engaging recesses (R) of the follower plates 232 engage the supporting ribs 217, thus permitting the follower sheets 232 and the tongues 234 to be biased by the rear springs 233 to turn downward into the positioning grooves 214. As a result, the tongues 234 are disengaged from the rear recesses 13 of the notebook computer 1. In this case, the curved pressing surface 238 of the slide unit 23 presses and turns upward the rear end portion 271 of the latch bar 27 against the biasing force of the front spring 28 so as to disengage the front retaining unit 272 of the latch bar 27 from the front recess unit 12 of the notebook computer 1, thereby enabling the notebook computer 1 to move forward away from the rear fence 22 of the docking station 2 along the guide slot 216 (see FIG. 1).

In assembly, as shown in FIG. 1, the notebook computer 1 can be placed on the top wall 210 in such a manner that the left or right sides of the notebook computer 1 and the rectangular projection 215 of the top wall 210 are aligned so as to engage the guide rib 11 of the notebook computer 1 with the guide slot 216 of the top wall 210. Then, the notebook computer 1 is pushed rearward on the top wall 210 along the guide slot 216 until the rear end portion of the notebook computer 1 abuts against the fingers 239 of the slide unit 23. Then, the push lever 26 is rotated simply from the unlocking position to the completely locked position so as to move the notebook computer 1 from the disconnected position to the completely connected position.

Referring to FIGS. 2,6,7 and 8, each of the rear recesses 13 of the notebook computer 1 is defined by a rear side wall (W) which is positioned relative to the corresponding tongue 234 of the slide unit 23 so that the tongues 234 can impel the rear side walls (W) and the notebook computer 1 to move rearward from the disconnected position to the completely connected position during the rotation of the push lever 26 (see FIG. 1) from the unlocking position to the completely locked position.

The foregoing detailed description is to be clearly understood as being given by way of illustration and example only, the spirit and scope of the present invention being limited solely by the appended claims.

What is claimed is:

1. A docking station for use in operatively connecting a portable computer to a peripheral device, the portable computer having a first electrical connector thereon, said docking station comprising:

a first portion on which a second electrical connector is carried;

a second portion on which the portable computer may be placed and moved therealong in a docking direction to releasably couple said first and second electrical connectors; and a latch structure operative in response to movement of the portable computer along said second portion in said docking direction to engage and releasably latch the portable computer to said second portion at two locations spaced apart in said docking direction.

2. The docking station of claim 1 wherein:

the portable computer is movable along said second portion in an undocking direction opposite from said docking direction to uncouple said first and second electrical connectors, and said latch structure is further operative in response to movement of the portable computer along said second portion in said undocking direction to unlatch the portable computer from said second portion.

3. The docking station of claim 2 further comprising:

a drive structure operative to engage and forcibly move the portable computer along said second portion in said docking and undocking directions.

4. The docking station of claim 3 wherein:

said latch structure is linked to and operated by said drive structure.

5. A docking station for use in operatively connecting a portable computer to a peripheral device, the portable computer having a first electrical connector thereon, said docking station comprising:

a first portion on which a second electrical connector is carried;

a second portion on which the portable computer may be placed; and drive and latch apparatus selectively operative to engage the portable computer and (1) drive the portable computer along said second portion toward said first portion in a docking direction and responsively couple said first and second electrical connectors and releasably latch the portable computer to said second portion at two locations spaced apart in said docking direction, and (2) drive the portable computer along said second portion away from said first portion in an undocking direction and responsively uncouple said first and second electrical connectors and unlatch the portable computer from said second portion.

6. The docking station of claim 5 wherein:

said drive and latch apparatus is manually operable.

7. A docking station for use in operatively connecting a Portable computer to a peripheral device, the portable computer having a first electrical connector thereon, said docking station comprising:

a first portion on which a second electrical connector is carried;

a second portion on which the portable computer may be placed: and drive and latch apparatus selectively operative to engage the portable computer and (1) drive the portable computer along said second portion toward said first portion in a docking direction and responsively couple said first and second electrical connectors and releasably latch the portable computer to said second portion at two locations spaced apart in said docking direction, and (2) drive the portable computer along said second portion away from said first portion in an undocking direction and responsively uncouple said first and second electrical connectors and unlatch the portable computer from said second portion, said drive and latch apparatus including:

a drive member supported for translational movement relative to said second portion of said docking station in a direction parallel to said docking direction, a first latch structure carried by said drive member for translational movement therewith, said first latch structure being pivotable, in response to translation of said drive member, between a latching position in which said first latch structure is adapted to engage a first one of said two locations on the portable computer, and an unlatching position in which said first latch structure is adapted to be disengaged from the portable computer, and a second latch structure pivotable, in response to translation of said drive member, between a latching position in which said second latch structure is adapted to latchingly engage the other one of said two locations on the portable computer, and an unlatching position in which said second latch structure is adapted to be from the portable computer.

8. The docking station of claim 7 wherein said drive and latch apparatus further includes:
a force input member linked to said drive member and operative to receive a manual docking/undocking force and responsively create driven translation of said drive member relative to said second portion of said docking station.

9. The docking station of claim 8 wherein:
said force input member is a lever member supported for pivotal movement relative to said second portion, a first end of said lever member being linked to said drive member, and a second end of said lever member being positioned to receive the manual docking/undocking force.

10. The docking station of claim 7 wherein said first latch structure includes:
a first latch member pivotally supported on said drive member, and a spring structure pivotally biasing said first latch member toward said unlatching position thereof.

11. The docking station of claim 10 wherein:
said first portion of said docking station is positioned rearwardly of said second portion thereof, and
said first latch member is operative to latchingly engage a rear portion of the portable computer.

12. The docking station of claim 7 wherein said second latch structure includes:
a second latch member pivotally supported on said second portion of said docking station, and a spring structure pivotally biasing said second latch member toward said latching position thereof, said second latch member being positioned to be engaged and forcibly pivoted to its unlatching position by said drive member during translational movement thereof in said undocking direction.

13. The docking station of claim 12 wherein:
said first portion of said docking station is positioned rearwardly of said second portion thereof, and said second latch member is operative to latchingly engage a front portion of the portable computer.

14. Computer apparatus comprising:
a portable computer having spaced apart front and rear portions, and a first electrical connector carried by said rear portion; and
a docking station for use in operatively connecting said portable computer to a peripheral device, said docking station including:
a rear portion on which a second electrical connector is carried,
a front portion on which said portable computer may be placed, and
drive and latch apparatus selectively operative to engage said portable computer and (1) rearwardly drive said portable computer along said front portion of said docking station and responsively couple said first and second electrical connectors and releasably latch said spaced apart front and rear portions of said portable computer to said front portion of said docking station, and (2) forwardly drive said portable computer along said front portion of said docking station and responsively uncouple said first and second electrical connectors and unlatch said front and rear portions of said portable computer from said front portion of said docking station.

15. The computer apparatus of claim 14 wherein said portable computer is a notebook computer.

16. The computer apparatus of claim 14 wherein said drive and latch apparatus is manually operable.

17. Computer apparatus comprising:
a portable computer having spaced apart front and rear portions, and a first electrical connector carried by said rear portion: and
a docking station for use in operatively connecting said portable computer to a peripheral device, said docking station including:
a rear portion on which a second electrical connector is carried,
a front portion on which said Portable computer may be placed, and
drive and latch apparatus selectively operative to engage said portable computer and (1) rearwardly drive said portable computer along said front portion of said docking station and responsively couple said first and second electrical connectors and releasably latch said spaced apart front and rear portions of said portable computer to said front portion of said docking station, and (2) forwardly drive said portable computer along said front portion of said docking station and responsively uncouple said first and second electrical connectors and unlatch said front and rear portions of said portable computer from said front portion of said docking station, said drive and latch apparatus including:
a drive member supported for forward and rearward translational movement relative to said front portion of said docking station,
a first latch structure carried by said drive member for translational movement therewith, said first latch structure being pivotable, in response to translation of said drive member, between a latching position in which said first latch structure latchingly engages said rear portion of said portable computer, and an unlatching position in which said first latch structure is disengaged from said portable computer, and
a second latch structure pivotable, in response to translation of said drive member, between a latching position in which said second latch structure latchingly engages said front portion of said portable computer, and an unlatching position in which said second latch structure is disengaged from the portable computer.

18. The computer apparatus of claim 17 wherein said drive and latch apparatus further includes:
a force input member linked to said drive member and operative to receive a manual docking/undocking force and responsively create driven translation of said drive member relative to said front portion of said docking station.

19. The computer apparatus of claim 18 wherein:
said force input member is a lever member supported for pivotal movement relative to said front portion of said docking station, a first end of said lever member being linked to said drive member, and a second end of said lever member being positioned to receive the manual docking/undocking force.

20. The computer apparatus of claim 17 wherein said first latch structure includes:
a first latch member pivotally supported on said drive member, and a spring structure pivotally biasing said first latch member toward said unlatching position thereof.

21. The computer apparatus of claim 17 wherein said second latch structure includes:
a second latch member pivotally supported on said front portion of said docking station, and a spring structure pivotally biasing said second latch member toward said latching position thereof, said second latch member being positioned to be engaged and forcibly pivoted to its unlatching position by said drive member during forward translational movement thereof relative to said front portion of said docking station.

22. An assembly of a portable computer and a docking station, said docking station having a base and a rear fence which is fixed on and above a rear end portion of said base and which is provided with a connector unit thereon, said assembly including a locking apparatus for locking said portable computer on said docking station when said portable computer is coupled completely with said connector unit of said docking station,
said portable computer having a bottom surface formed with a front recess unit located at a front end portion thereof, and a rear recess unit located at a rear end portion thereof, said portable computer further having a latch hole which is formed therein in communication with said front recess unit,
said docking station including:
a slide unit which is slidably mounted in said base and which is provided with a rear retaining unit attached thereto, said slide unit being located in a rear limit position on said base so as to engage said rear retaining unit within said rear recess unit,
a latch bar which is mounted pivotally in said base at an intermediate portion thereof and which has a rear end portion and a front end portion that is provided with a fixed front retaining unit engaged within said front recess unit of said portable computer so as to prevent forward removal of said portable computer from said rear fence of said docking station, said front end portion of said latch bar being formed with a fixed horizontal insert rod which is inserted into said latch hole of said portable computer so as to prevent upward removal of said portable computer from said base of said docking station, thus locking said portable computer on said docking station,
a front spring biasing said front retaining unit of said latch bar into said front recess unit, and
an actuator unit located in a completely locked position in which said portable computer is located in a completely connected position so that said portable computer is coupled completely with said connector unit of said docking station, said actuator unit being movable to a partly locked position in which said portable computer is carried on said slide unit and is moved forward along with said slide unit on said base of said docking station to a partly connected position so as to disconnect partly from said connector unit of said docking station, location of said actuator unit on said partly locked position activating said latch bar to disengage said horizontal insert rod of said front retaining unit of said latch bar from said latch hole of said portable computer while still maintaining engagement of said front retaining unit within said front recess unit of said portable computer, said actuator unit being capable of being actuated in a single action to move from said completely locked position to an unlocking position via said partly locked position so that said slide unit moves to a front limit position in which said slide unit pushes said notebook computer forward on said base of said docking station to a disconnected position in which said portable computer is disconnected completely from said connector unit of said docking station and in which said rear retaining unit is disengaged from said rear recess unit, forward movement of said slide unit on said base pressing said slide unit against said rear end portion of said latch bar during movement of said push lever from said partly locked position to said unlocking position, so as to disengage said front retaining unit of said latch bar from said front recess unit of said portable computer against the biasing force of said front spring, thereby unlocking said portable computer from said docking station, said push lever being movable in a one-action operation from said unlocking position to said completely locked position via said partly locked position on said base of said docking station so as to move said portable computer carried by said slide unit from said disconnected position to said completely connected position via said partly connected position on said base of said docking station.

23. The assembly of claim 22 wherein said base of said docking station has a generally rectangular top wall with a generally straight rear side which is connected fixedly to said rear fence and which has two aligned notches formed therein, said top wall further having a hole formed through a front end portion thereof so that said front retaining unit of said docking station can extend into said front recess unit of said portable computer through said hole of said top wall, said rear recess unit including two aligned rear recesses formed in said bottom surface of said notebook computer, said top wall further having two positioning grooves which are formed in a top surface thereof and which are located under said rear recesses of said portable computer near said notches, said slide unit being generally T-shaped and having a main body which is slidable over a bottom surface of said top wall, two arms extending integrally from two sides of said main body and located within said notches of said top wall, two follower sheets which are respectively pivoted to said arms in such a manner that said follower sheets can rotate about a horizontal axis parallel to said rear side of said top wall, and two rear springs interconnecting said arms and said follower sheets so as to bias said follower sheets to press against said top surface of said top wall of said base, thereby clamping said top wall between said main body and said follower sheets, each of said follower sheets having a tongue projecting integrally and upwardly therefrom into a respective one of said rear recesses, said tongues constituting said rear retaining unit.

24. The assembly of claim 23 wherein said top wall of said base further has a generally rectangular projection which projects integrally upward from said top surface thereof and which has a width approximately equal to that of said portable computer, and a guide slot formed in said top surface of said top wall and extending in a direction perpendicular to said rear side of said base, said bottom surface of said portable computer including a guide rib projecting integrally therefrom into said guide slot of said base, whereby said portable computer can be guided to move on said base of said docking station along a straight path by engagement of said guide rib and said guide slot in order to lock said portable computer on said docking station and to unlock said portable computer from said docking station.

25. The assembly of claim 23 wherein said top wall of said base is made of plastic and has two groove-forming portions, each of which has a generally V-shaped cross-section and includes a front inclined plate section and a rear inclined plate section that are interconnected at lower ends thereof at a straight line generally parallel to said rear side of said top wall, each of said rear inclined plate sections having a supporting rib which projects upward therefrom and which extends in a direction perpendicular to said rear side of said top wall, said follower sheets being located over said supporting ribs, each of said follower sheets having a rib engaging recess which is formed in a bottom surface thereof and which is located behind a corresponding one of said supporting ribs, said slide unit being capable of moving forward on said base so as to engage said supporting ribs within said rib engaging recesses, thus permitting said tongues of said follower sheets to be biased by said rear springs into said positioning grooves of said top wall and disengaging said tongues from said rear recesses of said portable computer.

26. The assembly of claim 22 wherein said slide unit is guided to move on said base in a direction perpendicular to said rear side of said base, and has a horizontally extending slide slot which is formed therein and which extends in a direction generally parallel to said rear side of said top wall, said actuator unit including a push lever which includes a lever body and a vertically extending pin that is secured to an intermediate portion of said lever body and that is slidably engaged in said slide slot of said slide unit, said lever body having a pivot end pivotally mounted on said top wall of said base, and a finger-actuated end which is exposed to the exterior of said docking station and which is rotatable about said pivot end so as to move said pin in said slide slot, thereby moving said slide unit on said top wall of said base.

27. The assembly of claim 22 wherein said front spring is a coiled compression spring which has an upper end secured to said bottom surface of said top wall, and a lower end secured to said rear end portion of said latch bar, said slide unit having a curved pressing surface which is adjacent and spaced from said rear end portion of said latch bar and which presses against said rear end portion of said latch bar during movement of said actuator unit from said partly locked position to said unlocking position, against the biasing force of said front spring so as to disengage said front retaining unit of said latch bar from said front recess unit.

28. The assembly of claim 22 wherein said slide unit includes an integral finger unit which projects horizontally and forwardly from a rear end portion thereof and which is located at a level above said top wall of said base so as to contact and push said portable computer forward during forward movement of said portable computer on said base from said completely connected position to said disconnected position by operating said actuator unit.

29. The assembly of claim 22 wherein said rear recess unit of said portable computer is defined by a rear side wall which is position relative to said rear retaining unit of said docking station so that said rear retaining unit impels said rear side wall and said portable computer to move rearward from said disconnected position to said completely connected position by operating said actuator unit.

30. The assembly of claim 22 wherein said portable computer is a notebook computer.

* * * * *